US010220777B2

(12) United States Patent
Wahl et al.

(10) Patent No.: US 10,220,777 B2
(45) Date of Patent: Mar. 5, 2019

(54) METHOD FOR WARNING A DRIVER OF A SINGLE-TRACK MOTOR VEHICLE OF LEAVING THE TRAFFIC LANE

(71) Applicant: Robert Bosch GmbH, Stuttgart (DE)

(72) Inventors: Anja Wahl, Markgroeningen (DE); Gunther Schaaf, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 675 days.

(21) Appl. No.: 14/401,417

(22) PCT Filed: Mar. 18, 2013

(86) PCT No.: PCT/EP2013/055509
§ 371 (c)(1),
(2) Date: Nov. 14, 2014

(87) PCT Pub. No.: WO2013/170979
PCT Pub. Date: Nov. 21, 2013

(65) Prior Publication Data
US 2015/0130943 A1 May 14, 2015

(30) Foreign Application Priority Data
May 14, 2012 (DE) .................. 10 2012 207 981

(51) Int. Cl.
*B60Q 9/00* (2006.01)
*B60W 50/14* (2012.01)
(Continued)

(52) U.S. Cl.
CPC ....... *B60Q 9/008* (2013.01); *B60W 30/18145* (2013.01); *B60W 50/14* (2013.01);
(Continued)

(58) Field of Classification Search
CPC .............. B60Q 9/008; G06K 9/00798; G06K 9/00805; B60R 1/00; G08G 1/04; H04N 7/181
See application file for complete search history.

(56) References Cited

U.S. PATENT DOCUMENTS 5,351,044 A * 9/1994 Mathur ................ G05D 1/0246
340/436
5,904,218 A * 5/1999 Watkins ................ B62D 61/02
180/209
(Continued)

FOREIGN PATENT DOCUMENTS

DE           38 39 520       5/1990
DE     20 2009 009 000       6/2009
(Continued)

OTHER PUBLICATIONS

International Search Report for PCT/EP2013/055509, dated Jun. 11, 2013.

*Primary Examiner* — Shawn S An
(74) *Attorney, Agent, or Firm* — Norton Rose Fulbright US LLP; Gerard Messina

(57) ABSTRACT

In a method for warning a driver of a single-track motor vehicle of leaving the traffic lane, at least one traffic lane boundary is ascertained by a video sensor system, the lateral distance of a reference point on the motor vehicle from the traffic lane boundary is ascertained, lean angle information of the motor vehicle describing the lean angle of the motor vehicle is ascertained, and it is ascertained, with the aid of at least the lateral distance and the lean angle information, whether part of the vehicle or of the rider projects beyond the traffic lane boundary.

9 Claims, 2 Drawing Sheets

(51) Int. Cl.
  *B60W 30/18* (2012.01)
  *G06K 9/00* (2006.01)
  *B60R 1/00* (2006.01)
  *G08G 1/04* (2006.01)
  *H04N 7/18* (2006.01)

(52) U.S. Cl.
  CPC ..... *G06K 9/00798* (2013.01); *G06K 9/00805* (2013.01); *B60R 1/00* (2013.01); *B60W 2300/36* (2013.01); *B60W 2420/42* (2013.01); *B60W 2520/18* (2013.01); *B60Y 2200/12* (2013.01); *G08G 1/04* (2013.01); *H04N 7/181* (2013.01)

(56) References Cited

U.S. PATENT DOCUMENTS

| | | | | |
|---|---|---|---|---|
| 6,405,132 | B1* | 6/2002 | Breed | B60N 2/002 |
| | | | | 701/117 |
| 2007/0164852 | A1* | 7/2007 | Litkouhi | B60G 17/0195 |
| | | | | 340/435 |
| 2012/0206708 | A1* | 8/2012 | Roelke | B60W 30/12 |
| | | | | 356/4.01 |
| 2012/0212612 | A1* | 8/2012 | Imai | G06K 9/00798 |
| | | | | 348/148 |
| 2013/0311075 | A1 | 11/2013 | Tran et al. | |

FOREIGN PATENT DOCUMENTS

| | | |
|---|---|---|
| DE | 10 2009 054756 | 6/2011 |
| JP | 07-014100 A | 1/1995 |
| JP | H09-295524 A | 11/1997 |
| JP | 2006-236156 A | 9/2006 |
| JP | 2007-126061 A | 5/2007 |

* cited by examiner

METHOD FOR WARNING A DRIVER OF A SINGLE-TRACK MOTOR VEHICLE OF LEAVING THE TRAFFIC LANE

BACKGROUND OF THE INVENTION

1. Field of the Invention

The present invention relates to method for warning a driver of a single-track motor vehicle regarding leaving the traffic lane.

2. Description of the Related Art

When driving through a curve with a two-wheeled vehicle, the vehicle assumes a lean angle that varies in size as a function of the curve radius and the driving speed. With the aid of modern inertial sensors it is possible to ascertain this lean angle. Motorcycles having such sensors and the respective algorithms for estimating the lean angle are known from the related art.

Furthermore, a system for detecting vehicles driving in the wrong direction and for warning of such is known from German Patent publication No. 20 2009 009 000 U1. This system includes at least one magnetic field sensor, which generates a signal when detecting a vehicle driving in the wrong direction of a roadway, and a wrong-way driver warning device for outputting a warning to a driver of the vehicle driving in the wrong direction. For this purpose, at least one magnetic field sensor is installed in the direction of wrong-way driving at a certain distance in front of and/or behind the wrong-way driver warning device in a bore hole in the roadway.

BRIEF SUMMARY OF THE INVENTION

The present invention relates to a method for warning a driver of a single-track motor vehicle of leaving the traffic lane, in which
- at least one traffic lane boundary is ascertained by a video sensor system,
- the lateral distance of a reference point on the motor vehicle from the traffic lane boundary is ascertained,
- lean angle information of the motor vehicle describing the lean angle of the motor vehicle is ascertained, and,
- based on at least the lateral distance and the lean angle information, it is ascertained whether part of the vehicle or of the rider projects beyond the traffic lane boundary. In doing so, the protruding of the driver, for example, of a motorcycle into the oncoming traffic lane may be detected and, in the event of oncoming traffic, a collision may be avoided as a result.

One advantageous further development of the present invention is characterized by the fact that an estimated value for the vertical distance between the upper helmet limit and the reference point on the motor vehicle is specified, and using at least the lateral distance, the lean angle information and the estimated value, it is ascertained whether part of the rider projects beyond the traffic lane boundary.

One advantageous further development of the present invention is characterized by the fact that the reference point pertains to the position of a video camera mounted on the motor vehicle or a position point on or inside the video camera.

One advantageous further development of the present invention is characterized by the fact that the traffic lane boundary pertains to the boundary to an adjacent traffic lane.

One advantageous further development of the present invention is characterized by the fact that the roadway width is ascertained and that the center of the roadway is taken as the boundary or boundary line to the adjacent traffic lane. This development is particularly relevant if the center of the roadway is not marked.

One advantageous further development of the present invention is characterized by the fact that, if it is ascertained that part of the motor vehicle or of the rider projects beyond the traffic lane boundary, a warning to the driver or rider takes place. As a result, the driver is provided with the opportunity to fully return to his/her own traffic lane, for example, by a steering motion.

One advantageous further development of the present invention is characterized by the fact that
- the traffic lane boundary pertains to the boundary to an adjacent traffic lane,
- the video sensor system ascertains whether the adjacent traffic lane has oncoming traffic or other road users, and
- a warning to the driver or rider takes place only if oncoming traffic or other road users is/are ascertained. This means that a driver warning takes place only in critical situations.

Furthermore, the present invention encompasses a device, in particular a control unit, which has means that are configured to carry out the methods previously described. This means that the program code for carrying out the methods is stored in this control unit or in this device.

DETAILED DESCRIPTION OF THE INVENTION

Even if a driver of a two-wheeled vehicle cuts a curve within his/her own traffic lane, meaning that the wheels of the two-wheeled vehicle are still located in his/her own traffic lane, the danger exists that the upper body of the driver protrudes into the adjacent traffic lane because of the lean angle of the two-wheeled vehicle. This is dangerous in particular in left-hand curves where oncoming traffic has to be expected. Alternatively, or in addition to existing warning systems that warn when driving on the adjacent or wrong traffic lane, it is the object of the present invention to warn the driver of the two-wheeled vehicle in the event that he/she protrudes into the adjacent traffic lane because of the lean angle. Depending on whether oncoming traffic is detected via the video system, the urgency of the warning may be raised. Preconditions for the present invention are:
- a video system installed in or mounted on the two-wheeled vehicle to ascertain traffic lane markings and/or to ascertain the roadway width with the aid of asphalt boundaries
- the possibility to ascertain lean angle information or a lean angle estimate using an existing inertial sensor system or the video system.

If the center of the roadway is marked, then lateral distance $s_m$ of the video camera from the center of the roadway is directly known via the traffic lane detection of the video system.

If only outer or no traffic lane markings exist, lateral distance $s_m$ to the center of the roadway may be ascertained using roadway width b (the distance of the outer traffic lane markings or the distance of the asphalt boundaries) detected
} via the video system, and the position of the video camera within roadway $s_a$: $s_m = b/2 - s_a$. Using existing lean angle information φ and distance h of the video camera from the upper helmet limit, a departure from the traffic lane may be checked via condition $\sin(\varphi) \cdot h \geq s_m$, and a respective warning may be output. For this purpose, $\sin(\varphi) \cdot h - s_m$ is the length by which the rider projects beyond the traffic lane boundary.

Variable h may be a fixed, uniform estimated value, which is seen in a driver of average body height, who sits on the motor vehicle in an average or typical sitting position. It is, however, also conceivable to ascertain variable h by means of sensors. In this case, the value of h varies, for example, as a function of the body height and sitting posture of the driver.

Figure 1:
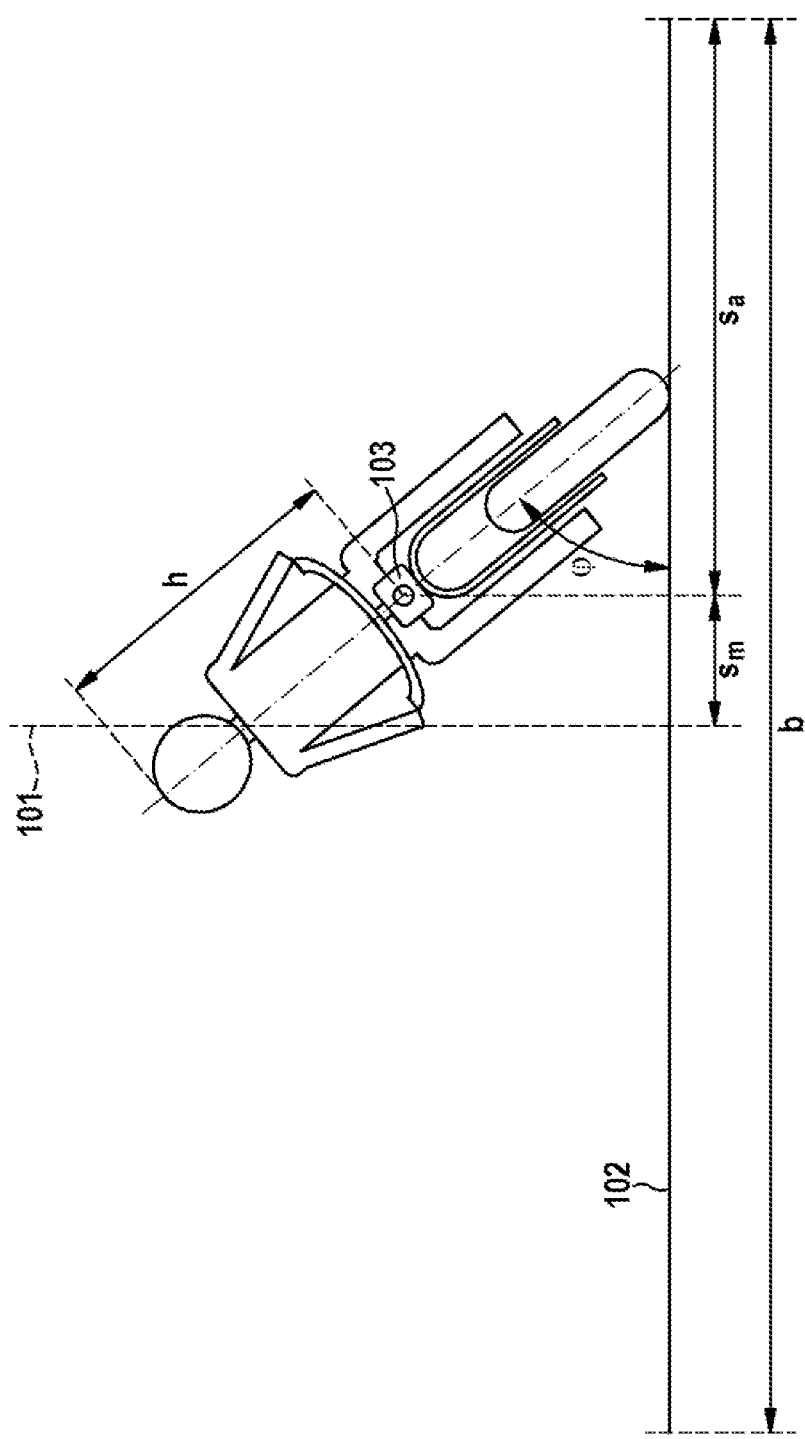
FIG. 1 shows a cross-section of a roadway and a single-track motor vehicle together with driver or rider located on the roadway.

The mathematical variables used are represented in FIG. 1:

φ characterizes the angle between the roadway and the vertical axis of the motor vehicle; b characterizes the total roadway width; dashed line 101 intersects with roadway 102 in the center of the roadway. $s_a$ characterizes the lateral distance of video camera 103 from the edge of the roadway, $s_m$ characterizes the lateral distance of the video camera from the center of the roadway.

Figure 2:
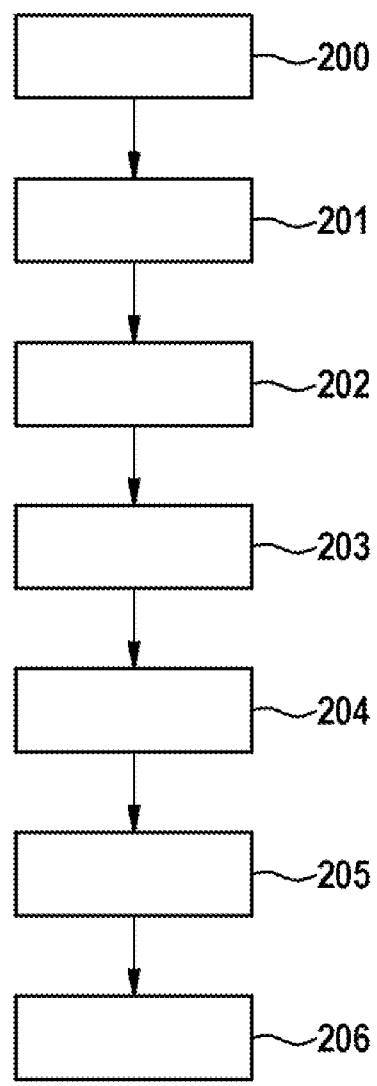
FIG. 2 shows the basic steps of a specific embodiment of the method according to the present invention.

FIG. 2 shows the basic steps of a specific embodiment of the present invention. After starting the method in block 200, the traffic lane boundary is ascertained in block 201 with the aid of a video sensor system. Subsequently, the lateral distance of a reference point on the motor vehicle from the traffic lane boundary is ascertained in block 202. The reference point may be in particular the video camera itself or a point of the video camera. In block 203, an angle describing the lateral tilt or lean angle of the motor vehicle is ascertained and, subsequently, the values ascertained in blocks 202 and 203 are used to ascertain in block 204 whether part of the motor vehicle or of the rider or driver projects beyond the traffic lane boundary. In the event of a projection beyond the traffic lane boundary, a warning is output to the driver or rider in block 205. The method of the present invention ends in block 206.

What is claimed is:

1. A method for warning a rider of a single-track motor vehicle of leaving a traffic lane, comprising:
    ascertaining, using a video sensor system, a traffic lane boundary of a traffic lane in which the single-track motor vehicle is traveling;
    ascertaining the lateral distance of a reference point on the single-track motor vehicle from the traffic lane boundary;
    ascertaining a lean angle information describing a lean angle of the single-track motor vehicle; and
    ascertaining, based on at least the lateral distance and the lean angle information, whether part of the single-track motor vehicle or part of the rider projects beyond the traffic lane boundary.

2. The method as recited in claim 1, wherein the reference point pertains to the position of a video camera.

3. The method as recited in claim 1, wherein the traffic lane boundary pertains to the boundary to an adjacent traffic lane.

4. The method as recited in claim 3, wherein the roadway width is ascertained and the boundary to the adjacent traffic lane is taken as the center of the roadway.

5. The method as recited in claim 1, further comprising:
    outputting a warning to the rider if it is ascertained that part of the single-track motor vehicle or part of the rider projects beyond the traffic lane boundary.

6. The method as recited in claim 5, wherein the traffic lane boundary pertains to the boundary to an adjacent traffic lane, and wherein the method further comprises:
    ascertaining, using the video sensor system, whether one of oncoming traffic or another road user is present in the adjacent traffic lane;
    wherein a warning to the rider takes place only if the presence of one of the oncoming traffic or another road user in the adjacent traffic lane is ascertained.

7. The method as recited in claim 1, wherein the lean angle information pertains to an angle between the traffic lane surface perpendicular to the driving direction and the vertical axis of the single-track motor vehicle.

8. A method for warning a rider of a single-track motor vehicle of leaving a traffic lane, comprising:
    ascertaining, using a video sensor system, a traffic lane boundary of a traffic lane in which the single-track motor vehicle is traveling;
    ascertaining the lateral distance of a reference point on the single-track motor vehicle from the traffic lane boundary;
    ascertaining a lean angle information describing a lean angle of the single-track motor vehicle;
    ascertaining, based on at least the lateral distance and the lean angle information, whether part of the single-track motor vehicle or part of the rider projects beyond the traffic lane boundary; and
    wherein an estimated value for a vertical distance between an upper helmet limit and the reference point on the single-track motor vehicle is specified, and the ascertaining of whether part of the rider projects beyond the traffic lane boundary is performed based on at least the lateral distance, the lean angle information and the estimated value.

9. A system for warning a rider of a single-track motor vehicle of leaving a traffic lane, comprising:
    a video sensor system ascertaining a traffic lane boundary of a traffic lane in which the single-track motor vehicle is traveling; and
    a control unit including a processor configured to:
        ascertain the lateral distance of a reference point on the single-track motor vehicle from the traffic lane boundary;
        ascertain a lean angle information describing a lean angle of the single-track motor vehicle; and
        ascertain, based on at least the lateral distance and the lean angle information, whether part of the single-track motor vehicle or part of the rider projects beyond the traffic lane boundary.

* * * * *